(12) United States Patent
Choi et al.

(10) Patent No.: US 8,687,578 B2
(45) Date of Patent: Apr. 1, 2014

(54) METHOD FOR TRANSMITTING AND RECEIVING RESOURCE ALLOCATION INFORMATION AND MOBILE STATION APPARATUS USING THE SAME

(75) Inventors: Jin Soo Choi, Gyeonggi-do (KR); Jin Sam Kwak, Gyeonggi-do (KR); Han Gyu Cho, Gyeonggi-do (KR); Sung Ho Moon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 13/201,723

(22) PCT Filed: Feb. 16, 2010

(86) PCT No.: PCT/KR2010/000939
§ 371 (c)(1),
(2), (4) Date: Aug. 16, 2011

(87) PCT Pub. No.: WO2010/093215
PCT Pub. Date: Aug. 19, 2010

(65) Prior Publication Data
US 2011/0299495 A1  Dec. 8, 2011

Related U.S. Application Data

(60) Provisional application No. 61/152,729, filed on Feb. 16, 2009, provisional application No. 61/153,246, filed on Feb. 17, 2009, provisional application No. 61/154,778, filed on Feb. 24, 2009.

(30) Foreign Application Priority Data

Jan. 25, 2010 (KR) .......................... 10-2010-0006393

(51) Int. Cl.
*H04W 4/00* (2009.01)
(52) U.S. Cl.
USPC .......................................... 370/329; 370/480

(58) Field of Classification Search
USPC ......... 370/310, 315, 316, 319, 321, 322, 328, 370/329, 340, 341, 345, 347, 348, 464, 370/480; 455/403, 422.1, 450, 452.1, 455
See application file for complete search history.

(56) References Cited

U.S. PATENT DOCUMENTS

| 2008/0101307 | A1 | 5/2008 | Sindhushayana et al. | |
| 2009/0257343 | A1 | 10/2009 | Qi et al. | |
| 2010/0120438 | A1* | 5/2010 | Kone et al. | 455/444 |
| 2011/0041027 | A1* | 2/2011 | Fong et al. | 714/749 |
| 2011/0244870 | A1* | 10/2011 | Lee | 455/444 |

OTHER PUBLICATIONS

IEEE 802.16m, Downlink Resource Mapping, IEEE C802.16m-08/503, http://www.ieee802.org/16 (Motorola) May 12, 2008.
Downlink distributed resource mapping and hopping for 802.16m, IEEE C802.16m-08_381r2, http://ieee802.org/16, (Huawei Technologies Co., Ltd.) May 5, 2008.
International Search Report for PCT/KR2010/000939.

* cited by examiner

*Primary Examiner* — Obaidul Huq
(74) *Attorney, Agent, or Firm* — Morgan, Lewis & Bockius LLP

(57) ABSTRACT

A method for allocating the resources of a remaining region other than a region carrying a SuperFrame Header (SFH) and signaling the resource allocation is disclosed. A Mobile Station (MS) receives resource allocation information about a remaining region other than a region carrying an SFH in a predetermined channel bandwidth by the SFH from a Base Station (BS) and decodes the received resource allocation information. The MS decodes control information efficiently by receiving repetition number information about a sub_secondary SFH (sub_S-SFH) or sub_secondary Broadcast CHannel (sub_S-BCH) from the BS by a Primary SFH (P-SFH) or Primary BCH (P-BCH).

7 Claims, 6 Drawing Sheets

METHOD FOR TRANSMITTING AND RECEIVING RESOURCE ALLOCATION INFORMATION AND MOBILE STATION APPARATUS USING THE SAME

This application is a national stage application of PCT Application No. PCT/KR2010/000939, filed on Feb. 16, 2010, which claims the benefit of U.S. Provisional Application No. 61/152,729, filed on Feb. 16, 2009, U.S. Provisional Application No. 61/153,246, filed on Feb. 17, 2009, and U.S. Provisional Application No. 61/154,778, filed on Feb. 24, 2009. The present national stage application also claims the benefit of Korean Patent Application No. 10-2010-0006393, filed Jan. 25, 2010.

TECHNICAL FIELD

The present invention relates to a wireless communication system, and more particularly, to a method for transmitting and receiving resource allocation information in a wireless communication system and a Mobile Station (MS) apparatus using the same.

BACKGROUND ART

In an Institute of Electrical and Electronics Engineers (IEEE) 802.16m system, a frame includes a plurality of subframes, each subframe having a plurality of subcarriers along a frequency axis and a plurality of Orthogonal Frequency Division Multiplexing (OFDM) symbols along a time axis. Some of the subframes in a frame are used for UpLink (UL) data transmission and the other subframes are used for DownLink (DL) data transmission. The IEEE 802.16m frame structure will be described below in brief.

FIG. 1 illustrates a basic frame structure in the IEEE 802.16m system.

Referring to FIG. 1, each 20-ms superframe is divided into four equal 5-ms frames, each having one of channel bandwidths 5, 10 and 20 MHz. According to its channel bandwidth, a 5-ms frame may include 7 or 8 subframes.

A subframe may be allocated for DL or UL transmission. According to their channel bandwidths, subframes may include different numbers of Orthogonal Frequency Division Multiple Access (OFDMA) symbols. Type-1, type-2 and type-3 subframes may be defined as subframes including 6, 7 and 5 OFDM symbols, respectively.

A Base Station (BS) may transmit system information and control information on control channels, and transmit data in the remaining frame regions except for the control channels to MSs in the frame structure. The control channels include a SuperFrame Header (SFH), an Advanced-MAP (A-MAP), etc.

Among the control channels, the SFH is divided into two parts, a Primary SFH (P-SFH) and a Secondary SFH (S-SFH). The SFH broadcasts mandatory or optional system information. Specifically, the BS may help an MS with initial network entry upon power-on, network reentry, and handover when the MS is moving, by transmitting an SFH to the MS.

As illustrated in FIG. 1, an SFH may be distributed at the starts of superframes. Alternatively, an SFH may be locally allocated in a predetermined region in the frame structure. In the latter case, there exists a need for a technique for allocating resources to the remaining region except for a region carrying an SFH, for efficient data transmission, and signaling the resource allocation by the SFH.

However, no studies have been made so far on techniques for allocating resources to the other subframes except for a subframe carrying an SFH and signaling the resource allocation.

As described above, an SFH (particularly, an S-SFH) or a Broadcast CHannel (BCH) is used to broadcast mandatory or optional system information to MSs. Accordingly, the S-SFH or the BCH needs robust transmission. To ensure the robustness, the S-SFH or the BCH needs to be transmitted repeatedly. Without knowledge of the repetition number of the S-SFH or the BCH, an MS suffers from great inefficiency of decoding received information.

Although the decoding inefficiency degrades the communication performance of the MS, there have not been studies to overcome the performance degradation.

DISCLOSURE OF INVENTION

Technical Problem

An object of the present invention devised to solve the problem lies on a method for transmitting and receiving resource allocation information.

Another object of the present invention devised to solve the problem lies on an MS apparatus for receiving resource allocation information.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for receiving resource allocation information at an MS, which includes receiving resource allocation information about a remaining region other than a region carrying a SFH in a predetermined channel bandwidth from a BS, and decoding the received resource allocation information. The remaining region is allocated as Distributed Resource Units (DRUs) only.

In another aspect of the present invention, provided herein is a method for receiving resource allocation information at a MS, which includes receiving resource allocation information about a remaining region other than a region carrying a SFH in a predetermined channel bandwidth from a BS, and decoding the received resource allocation information. The remaining region is allocated as DRUs or Contiguous Resource Units (CRUs), the DRUs or CRUs are allocated on a miniband basis, each miniband including one Physical Resource Unit (PRU), and the resource allocation information includes indication information indicating one of the number of CRUs, the number of DRUs, and a ratio between CRUs and DRUs.

In another aspect of the present invention, provided herein is a method for receiving resource allocation information at a MS, which includes receiving resource allocation information about a remaining region other than a region carrying an SFH in a predetermined channel bandwidth from a BS, and decoding the received resource allocation information. The remaining region is allocated as DRUs and CRUs, the DRUs are allocated on a miniband basis, the CRUs are allocated on a subband basis, and the resource allocation information includes information about the number or size of allocated subband CRUs and the number or size of miniband DRUs.

In another aspect of the present invention, provided herein is a method for transmitting resource allocation information in a BS, which includes transmitting resource allocation information about a remaining region other than a region carrying a SFH in a predetermined channel bandwidth to a MS. The remaining region is allocated as DRUs only.

In another aspect of the present invention, provided herein is a method for transmitting resource allocation information in a BS, which includes transmitting resource allocation information about a remaining region other than a region carrying a SFH in a predetermined channel bandwidth to a MS. The remaining region is allocated as DRUs or CRUs, the DRUs or CRUs are allocated on a miniband basis, each miniband including one PRU, and the resource allocation information includes indication information indicating one of the number of CRUs, the number of DRUs, and a ratio between CRUs and DRUs.

In another aspect of the present invention, provided herein is a method for transmitting resource allocation information in a BS, which includes transmitting resource allocation information about a remaining region other than a region carrying a SFH in a predetermined channel bandwidth to an MS. The remaining region is allocated as DRUs and CRUs, the DRUs are allocated on a miniband basis, the CRUs are allocated on a subband basis, and the resource allocation information includes information about the number or size of allocated subband CRUs and the number or size of allocated miniband DRUs.

In another aspect of the present invention, provided herein is an MS apparatus for receiving resource allocation information, including a reception module for receiving resource allocation information about a remaining region other than a region carrying an SFH in a predetermined channel bandwidth from a BS, and a decoding module for decoding the received resource allocation information. The remaining region is allocated as DRUs or CRUs, the DRUs or CRUs are allocated on a miniband basis, each miniband including a PRU, and the resource allocation information includes indication information indicating one of the number of CRUs, the number of DRUs, and a ratio between CRUs and DRUs.

In a further aspect of the present invention, provided herein is an MS apparatus for receiving resource allocation information, including a reception module for receiving resource allocation information about a remaining region other than a region carrying an SFH in a predetermined channel bandwidth from a BS, and a decoding module for decoding the received resource allocation information. The remaining region is allocated as DRUs and CRUs, the DRUs are allocated on a miniband basis, the CRUs are allocated on a subband basis, and the resource allocation information includes information about the number or size of allocated subband CRUs and the number or size of allocated miniband DRUs.

Advantageous Effects of Invention

The methods for allocating resources and signaling the resource allocation according to exemplary embodiments of the present invention reduce system complexity and signaling overhead, and increase communication performance such as user throughput.

Furthermore, an MS can decode a plurality of S-SFHs (or secondary BCHs) efficiently by receiving repetition information about them.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is an Institute of Electrical and Electronics Engineers (IEEE) 802.16m system. However, the description is applicable to any other mobile communication system except for specific features of the IEEE 802.16m system.

In some instances, known structures and devices are omitted, or are shown in a block diagram form focusing on important features of the structures and devices, so as not to obscure the concept of the present invention. The same reference numbers will be used throughout this specification to refer to the same or like parts.

In the following description, 'Mobile Station (MS)' is assumed to refer to a mobile or fixed user end device such as a User Equipment (UE), an Advanced Mobile Station (AMS), etc. and 'Base Station (BS)' is assumed to refer to any node of a network end, such as a Node B, an evolved Node B (eNB or eNode B), an Access Point (AP), etc., communicating with the MS.

In a mobile communication system, an MS may receive information from a BS on a DownLink (DL) and transmit information to the BS on an UpLink (UL). The information transmitted from or received at the MS includes data and various control information and a variety of physical channels are defined according to the types and usages of the information.

Among the physical channels, a brief description will be made of DL control channels in an IEEE 802.16m system.

The DL control channels carry information required for performing operations of the IEEE 802.16m system. The information is hierarchically transmitted at different time scales, ranging from a superframe level to an Advanced Air Interface (AAI) subframe level. In Wireless Metropolitan Area Network-Orthogonal Frequency Division Multiple Access/Advanced Air Interface (WirelessMAN-OFDMA/AAI) mode, an AMS may access the system without decoding a WirelessMAN-OFDMA Frame Control Header (FCH) and WirelessMAN-OFDMA MAP messages. A BS transmits mandatory system parameters and system configuration information to MSs in a SuperFrame Header (SFH).

Figure 1:
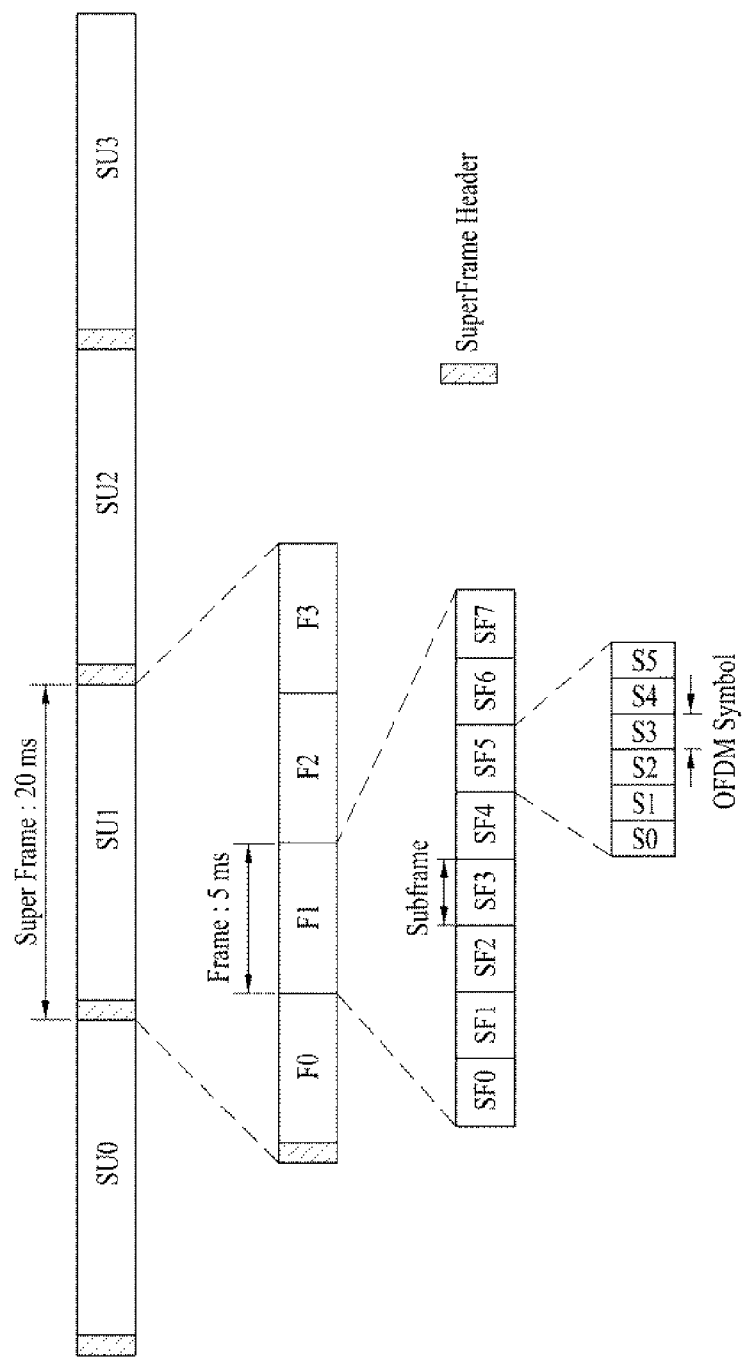
FIG. 1 illustrates a basic frame structure in an Institute of Electrical and Electronics Engineers (IEEE) 802.16m system.
Figure 2:
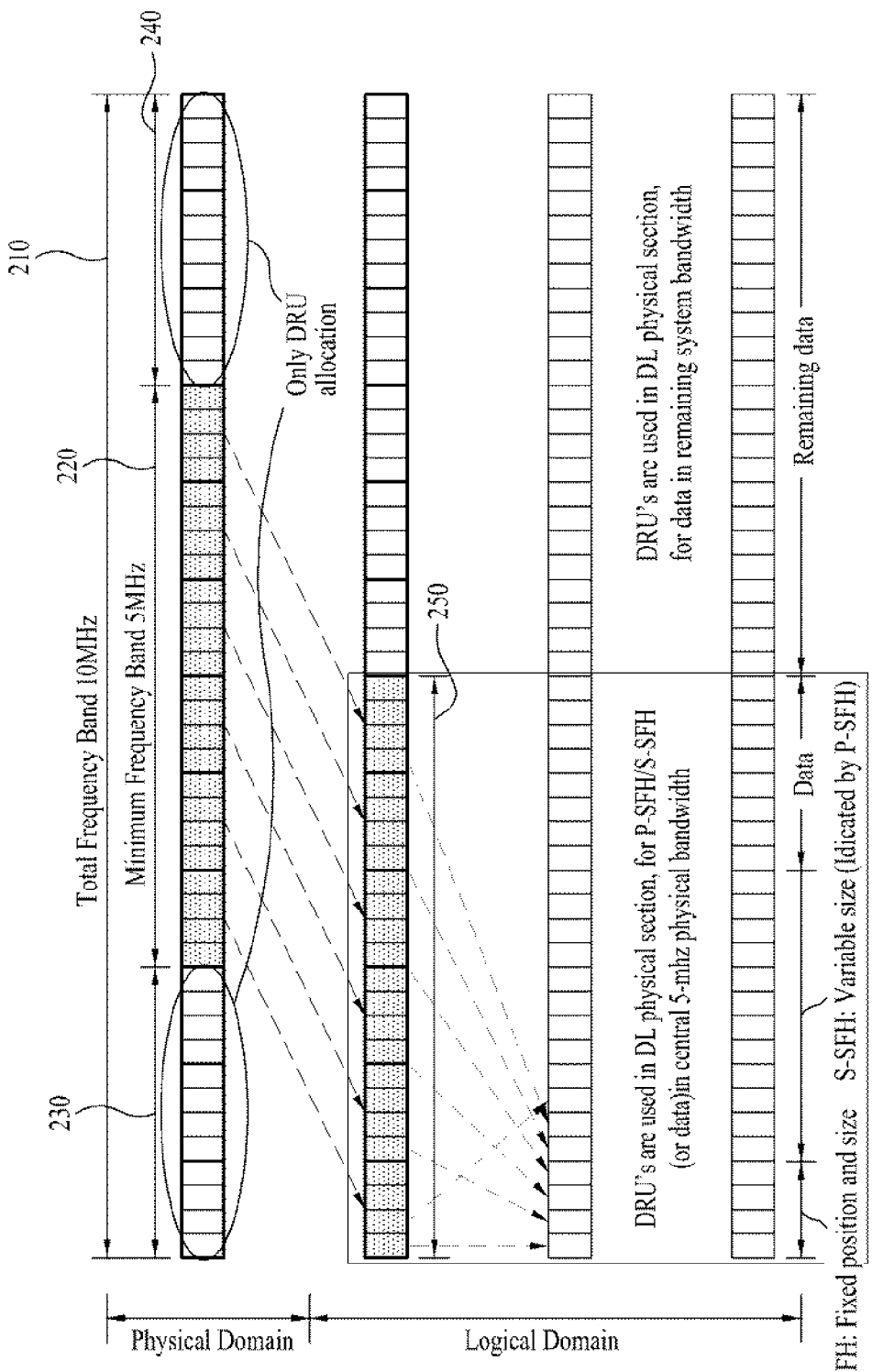
FIG. 2 illustrates a physical domain and a logical domain in a frame structure, referred to for describing a method for allocating resources to the remaining region except for a region carrying a SuperFrame Header (SFH) according to an exemplary embodiment of the present invention.

FIG. 2 illustrates a physical domain and a logical domain in a frame structure, referred to for describing a method for allocating resources to the remaining region except for a region carrying an SFH according to an exemplary embodiment of the present invention.

Referring to FIG. 2, a total channel bandwidth 210 is, for example, 10 MHz in the physical and logical domains. An SFH spans a minimum bandwidth 220 which is 5 MHz. The remaining regions 230 and 240 except for the SFH in the total channel bandwidth 210 occupy 5 MHz. The SFH region 220 at the center of the total channel bandwidth 210 in the physical domain may be mapped to a predetermined region 250 in the logical domain.

The SFH region 220 in the physical domain may be allocated only as Distributed Resource Units (DRUs). The remaining system bandwidths 230 and 240 except for the SFH region 220 may be allocated as only DRUs without Contiguous Resource Units (CRUs). The same DRU allocation rule as used for other subframes may be applied to the DRUs allocation of the remaining system bandwidths 230 and 240.

The DRU-only allocation of the remaining system bandwidths 230 and 240 may be preset in the system, which obviates the need for additional signaling of the resource allocation. The BS may transmit data and control information to MSs in the remaining system bandwidths 230 and 240 with DRUs only.

To reduce the complexity of the resource regions of the remaining system bandwidths 230 and 240 except for the physical central 5 MHz resource region 220 of the SFH, the remaining system bandwidths 230 and 240 may be allocated to a single Frequency Partition (FP).

As stated above, the DRU-only allocation of the remaining system bandwidths 230 and 240 obviates the need for additional signaling. Consequently, signaling overhead is considerably decreased and users requiring high-speed data traffic transmission may be supported.

Figure 3:
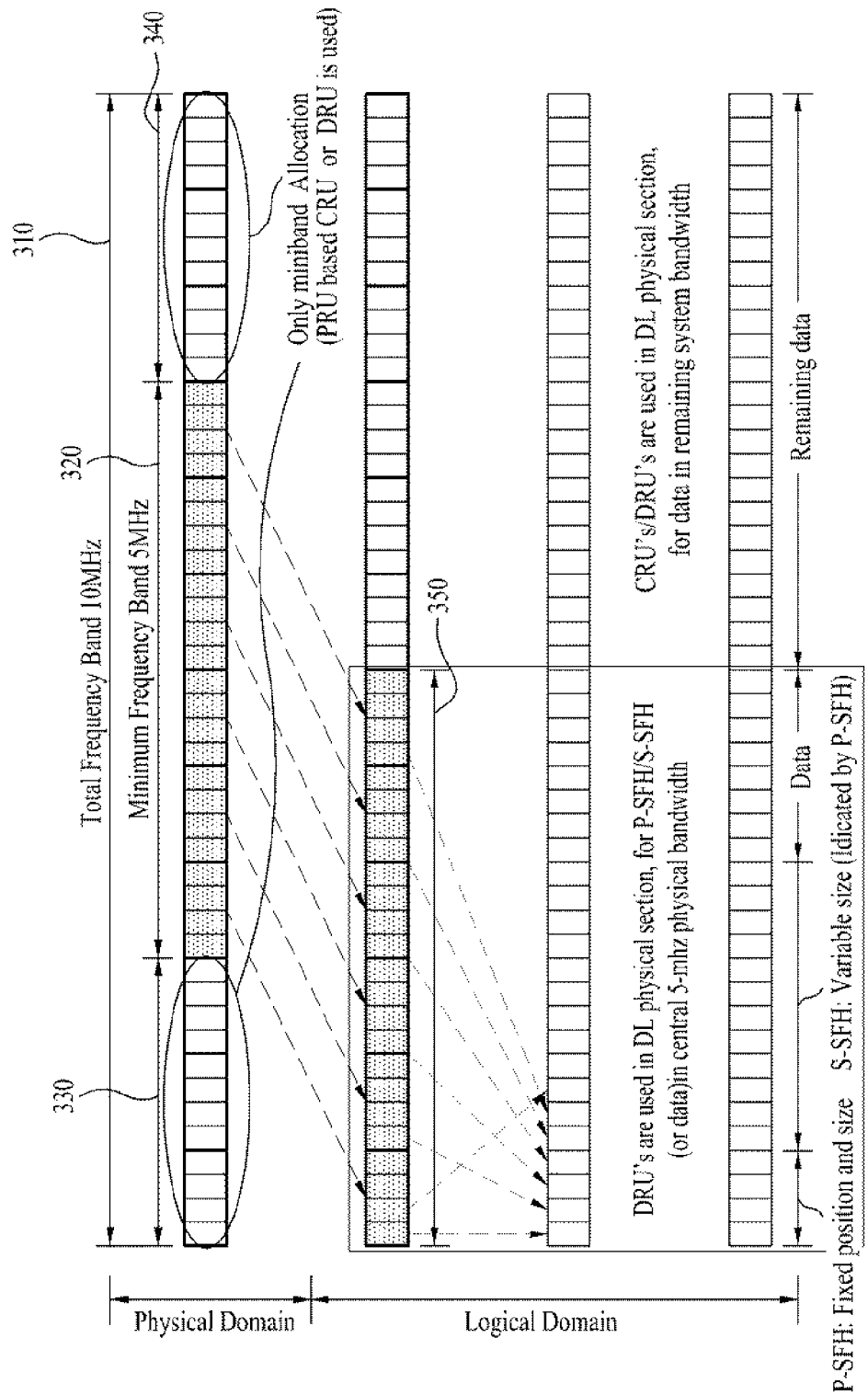
FIG. 3 illustrates a physical domain and a logical domain in a frame structure, referred to for describing a method for allocating resources to the remaining regions other than a region carrying an SFH according to another exemplary embodiment of the present invention.

FIG. 3 illustrates a physical domain and a logical domain in a frame structure, referred to for describing a method for allocating resources to the remaining regions other than a region carrying an SFH according to another exemplary embodiment of the present invention.

Referring to FIG. 3, a total channel bandwidth 310 is, for example, 10 MHz in the physical and logical domains, as in the illustrated case of FIG. 2. An SFH spans a minimum bandwidth 320 which is 5 MHz in the physical domain. The remaining regions 330 and 340 except for the SFH in the total channel bandwidth 310 occupy 5 MHz. The SFH region 320 at the center of the total channel bandwidth 310 in the physical domain may be mapped to a specific region 350 in the logical domain.

The remaining system bandwidths 330 and 340 except for the SFH region 320 may be allocated as CRUs or DRUs. The CRUs or DRUs may be allocated on a Physical Resource Unit (PRU) basis. That is, the remaining system bandwidths 330 and 340 may be allocated on a miniband basis, each miniband having one PRU. Therefore, the remaining system bandwidths 330 and 340 may be allocated as minibands without subbands.

The CRU to DRU ratio of the remaining system bandwidths 330 and 340 may be signaled to an MS in the SFH, particularly, an S-SFH in the subframe 320 carrying the SFH. Instead of the CRU to DRU ratio, the BS may transmit information about the number of CRUs or DRUs to the MS. The number of CRUs or DRUs may be represented as the number of PRUs or minibands. Alternatively or additionally, the number of CRUs or DRUs may be represented as a Subband Allocation Count (SAC) indicating the number of subbands, with a granularity of a multiple of 4, that is, indicating the number of subbands each including four PRUs.

To reduce the complexity of the resource regions of the remaining system bandwidths 330 and 340 except for the physical central 5 MHz resource region 320 of the SFH, the remaining system bandwidths 330 and 340 may be allocated to as single FP. On the other hand, if the resource regions of the remaining system bandwidths 330 and 340 are allocated to as a plurality of FPs, the BS needs to signal resource allocation information for each FP to the MS. Specifically, the CRU to DRU ratio or the number of CRUs or DRUs of each FP may be signaled. In addition, FP information (e.g. the number of FPs) needs to be signaled separately to the MS by the SFH (particularly, the S-SFH).

The allocation of the remaining system bandwidths 330 and 340 as CRUs as well as DRUs offer a number of benefits. Among them, a major effect is to achieve subband selection and increase user throughput.

Figure 4:
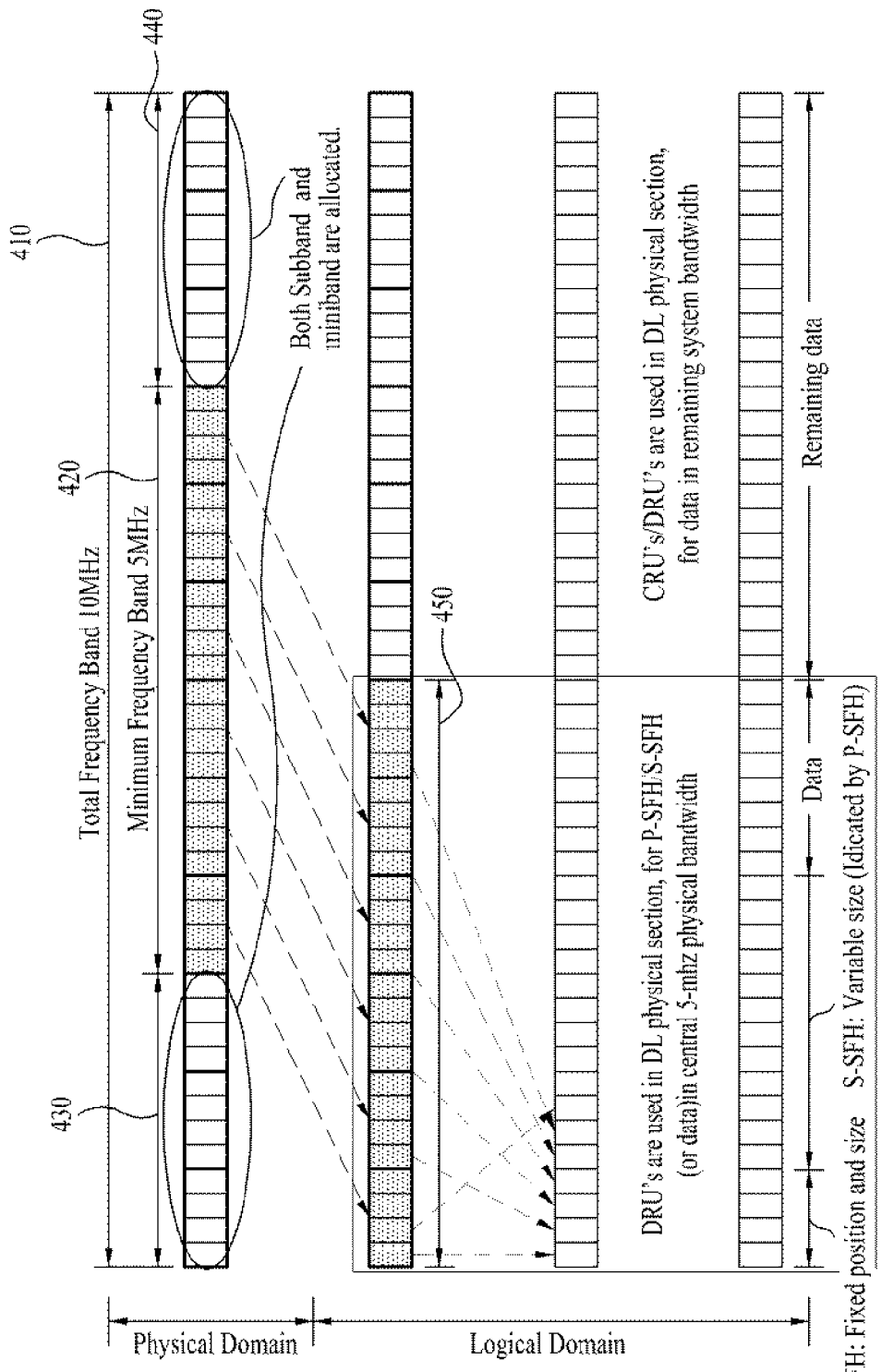
FIG. 4 illustrates a physical domain and a logical domain in a frame structure, referred to for describing a method for allocating resources to the remaining region except for a region carrying an SFH according to another exemplary embodiment of the present invention.

FIG. 4 illustrates a physical domain and a logical domain in a frame structure, referred to for describing a method for allocating resources to the remaining region except for a region carrying an SFH according to another exemplary embodiment of the present invention.

Referring to FIG. 4, a total channel bandwidth 410 is, for example, 10 MHz in the physical and logical domains, as in the illustrated case of FIG. 2. An SFH spans a minimum bandwidth 420 which is 5 MHz in the physical domain. The remaining regions 430 and 440 except for the SFH in the total channel bandwidth 410 occupy 5 MHz. The SFH region 420 at the center of the total channel bandwidth 410 in the physical domain may be mapped to a predetermined region 450 in the logical domain.

The BS may transmit resource allocation information about the remaining system bandwidths 430 and 440 to the MS in the SFH (particularly, an S-SFH) in the subframe 420 carrying the SFH. The resource allocation information may be an SAC indicating the size or number of subband CRUs.

Alternatively, the resource allocation information may be a miniband allocation count indicating the size or number of miniband DRUs.

To obviate the need for the BS to additionally signal the SAC or miniband allocation count to the MS, the SAC or miniband allocation count may be preset by the system.

To reduce the complexity of the resource regions of the remaining system bandwidths 430 and 440 except for the physical central 5 MHz resource region 420 of the SFH, the remaining system bandwidths 430 and 440 may be allocated to as single FP. On the other hand, if the resource regions of the remaining system bandwidths 430 and 440 are allocated as a plurality of FPs, the BS needs to signal resource allocation information on an FP basis to the MS. Specifically, the SAC or miniband allocation count of each FP may be signaled. In addition, FP information (e.g. the number of FPs) needs to be signaled separately to the MS by the SFH (particularly, the S-SFH).

The use of subbands for CRUs and minibands for DRUs in the resource regions of the remaining system bandwidths 430 and 440 reduces signaling overhead greatly, compared to the use of only CRUs in the resource regions of the remaining system bandwidths 430 and 440, and achieves a subband selection gain and increases Signal-to-Interference and Noise Ratio (SINR) and user throughput, compared to the use of only DRUs in the resource regions of the remaining system bandwidths 430 and 440.

In FIGS. 2, 3 and 4, specific FP information about a subframe following a subframe carrying an SFH may be applied to the subframe carrying the SFH.

As in FIGS. 2, 3 and 4, in case of a plurality of FPs, the BS may signal resource allocation information for each FP to the MS. Also, the BS may transmit FP information (e.g. the number of FPs) separately to the MS in an SFH (particularly, an S-SFH).

Figure 5:
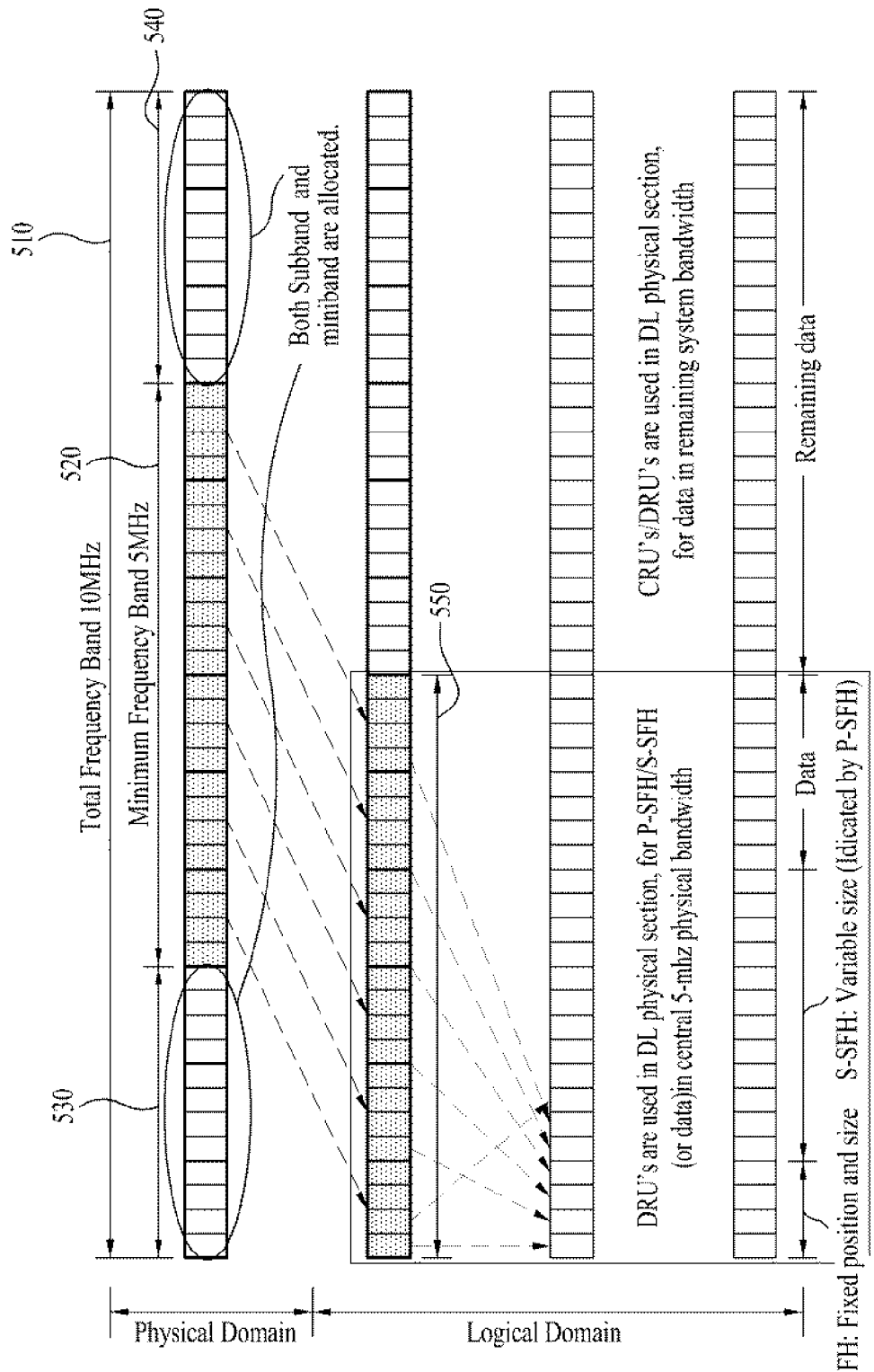
FIG. 5 illustrates a physical domain and a logical domain in a frame structure, referred to for describing a method for allocating resources to the remaining regions other than a region carrying an SFH according to a further exemplary embodiment of the present invention.

FIG. 5 illustrates a physical domain and a logical domain in a frame structure, referred to for describing a method for allocating resources to the remaining region other than a region carrying an SFH according to a further exemplary embodiment of the present invention.

Referring to FIG. 5, a total channel bandwidth 510 is, for example, 10 MHz in the physical and logical domains, as in the illustrated case of FIG. 2. An SFH spans a minimum bandwidth 520 which is 5 MHz in the physical domain. The remaining regions 530 and 540 except for the SFH in the total channel bandwidth 510 occupy 5 MHz. The SFH region 520 at the center of the total channel bandwidth 510 in the physical domain may be mapped to a predetermined region 550 in the logical domain.

As the remaining system bandwidths 430 and 440 are all allocated as subbands and minibands in the illustrated case of FIG. 4, the remaining system bandwidths 530 and 540 may be allocated as subbands and minibands as shown in FIG. 5. To reduce unnecessary complexity, the subbands may be allocated only as CRUs and the minibands may be allocated only as DRUs.

The BS may transmit resource allocation information about the remaining system bandwidths 530 and 540 to the MS in the SFH (particularly, an S-SFH) in the subframe 520 carrying the SFH. The resource allocation information may be an SAC indicating the size or number of subbands allocated to CRUs. The BS may signal the SAC by fixed bit indexing based on a maximum bandwidth or by bit indexing based on a different bit size for a different bandwidth to reduce signaling overhead.

The fixed bit indexing based on a maximum bandwidth will first be described. Given a maximum bandwidth of 20 MHz, there are 18 subbands corresponding to the remaining 15 MHz system bandwidth except for an SFH occupying 5 MHz. Then the BS may signal the number of allocated subbands by 5 bits-indexing required for expressing the 18 subbands to the MS. Considering DRUs carrying control information (e.g. A-MAP information), the number of allocated subbands may be signaled by 4-bit indexing.

Now a description will be made of the bit indexing with a different bit size for a different bandwidth to reduce signaling overhead.

The BS may transmit information about the number of subbands in a different bit size for each bandwidth to a MS. Specifically, 5-bit indexing may be used for a 20 MHz system bandwidth, and 3-bit indexing may be used for a 10 MHz system bandwidth. Considering DRUs used for control signaling, 4-bit indexing may be used for a 20 MHz system bandwidth and 2-bit indexing may be used for a 10 MHz system bandwidth to signal the number of allocated subbands to the MS.

Meanwhile, if all possible SAC values are preset in the system and the SAC values are fixed, for example, for respective bandwidths, the BS does not need to additionally signal the number of allocated subbands to the MS. As a consequence, signaling overhead may be reduced considerably.

To reduce the complexity of the resource regions of the remaining system bandwidths 530 and 540 except for the physical central 5-MHz resource region 520 of the SFH, the remaining system bandwidths 530 and 540 may be allocated to a single FP. On the other hand, if the resource regions of the remaining system bandwidths 530 and 540 are allocated to a plurality of FPs, the BS needs to signal resource allocation information on an FP basis to the MS. Specifically, the SAC of each FP may be signaled. In addition, FP information (e.g. the number of FPs) needs to be signaled separately to the MS by the SFH (particularly, the S-SFH).

In FIG. 5, specific FP information about a subframe following a subframe carrying an SFH may be applied to the subframe carrying the SFH.

In case of a plurality of FPs, the BS may signal resource allocation information for each FP to the MS. Also, the BS may transmit FP information (e.g. the number of FPs) separately to the MS in an SFH (particularly, an S-SFH).

In this manner, the BS may signal the number of subbands to the MS by bit indexing with a fixed bit size for a total system bandwidth, and if control signaling of an A-MAP, etc. is considered, by bit indexing with a smaller bit size. Alternatively, the BS may signal the number of subbands to the MS by a bit indexing with a different bit size for each bandwidth, to thereby considerably reduce signaling overhead.

So far, methods for allocating the resources of the remaining regions other than a region carrying an SFH in a predetermined channel bandwidth and signaling the resource allocation have been described. As stated before, DL control channels include a SFH, an A-MAP, etc. Particularly, the SFH needs robust transmission because it delivers system information. Thus the SFH needs to be repeatedly transmitted. Hereinafter, methods for signaling the repetition number of an SFH (particularly, an S-SFH) or a secondary BCH (S-BCH) to an MS will be described.

One of the repetition number signaling methods is to signal the repetition number of the S-SFH or S-BCH to the MS via a P-SFH or a primary BCH (P-BCH). There may be a system that transmits an S-BCH or S-SFH separately as a plurality of sub_S-BCHs or sub_S-SFHs to MSs, and a system that transmits S-BCHs or S-SFHs in a group to MSs.

In the system that transmits an S-BCH or S-FCH separately as a plurality of sub_S-BCHs or sub_S-SFHs to MSs, a BS may signal repetition number information to an MS by bit indexing based on a maximum repetition number in a P-BCH or P-SFH. If each sub_S-BCH or sub_S-SFH can be transmitted up to four times, 2-bit repetition number information for the sub_S-BCH or sub_S-SFH may be transmitted by the P-BCH or P-SFH. For example, 00, 01, 10 and 11 may indicate repetition numbers 0, 1, 2 and 3, respectively. Given six sub_S-BCHs or sub_S-SFHs, the BS may signal repetition number information to the MS in up to 12 (=2×6) bits of the P-BCH or P-SFH. If all of the sub_S-BCHs or sub_S-SFHs are not transmitted, 12 or fewer bits are required. The reserved bit size for representing a repetition number is a maximum bit size, herein 12 bits.

If the sub_S-SFHs are not separately encoded and instead, joint coding is applied to some or whole sub_S-SFHs, bit indexing may be applied by the number of Cyclic Redundancy Checks (CRCs), that is, the number of sub_S-SFH groups subjected to separate coding. For example, if the number of sub_S-SFH groups subjected to separate coding is 1, which implies that the whole sub-S-SFHs are to be jointly encoded, 2-bit indexing is used. If the number of sub_S-SFH groups subjected to separate coding is N, bit indexing is applied in (N×2) bits.

When the sub_S-BCHs or sub_S-SFHs are arranged in an ascending or descending order, the BS may not need signal the number of each sub_S-BCH or sub_S-SFH separately to the MS. The MS may identify a received sub_S-BCH or sub_S-SFH by indication information set in the P-BCH/P-SFH or S-BCH/S-SFH and find out repetition number information using the indication information without a large overhead.

In another example of signaling, the BS may signal repetition number information about a sub_S-BCH or sub_S-SFH to the MS by an S-BCH or S-FCH. In this case, the repetition number information may be signaled by a first-priority sub_S-BCH or sub_S-SFH.

In the system that transmits S-BCHs or S-FCHs in a group to MSs, a BS may signal repetition number information to an MS by bit indexing based on a maximum repetition number via a P-BCH or P-SFH. For example, if an S-BCH or S-FCH can be transmitted up to four times, the repetition number information may be signaled in 2 bits. 00, 01, 10 and 11 may represent repetition numbers 0, 1, 2, and 3, respectively. In another signaling example, the BS may signal repetition number information about a sub_S-BCH or sub_S-SFH to the MS by an S-BCH or S-SFH.

Another method for signaling repetition number information is to mask the CRC of a P-BCH or P-SFH with repetition number information, which obviates the need for additional signaling to the MS. As in the first method for signaling repetition number information, there may be a system that transmits an S-BCH or S-SFH separately as a plurality of sub_S-BCHs or sub_S-SFHs to MSs, and a system that transmits S-BCHs or S-SFHs in a group to MSs.

Repetition number information about each sub_S-BCH or sub_S-SFH may be masked on a predetermined number of bits in the CRC of a P-BCH or P-SFH. If each sub_S-BCH or sub_S-SFH can be transmitted up to four times, the number of bits on which repetition number information about each sub_S-BCH or sub_S-SFH is masked may be 2. For instance, 00, 01, 10 and 11 may represent repetition numbers 0, 1, 2 and 3, respectively.

Given six sub_S-BCHs or sub_S-SFHs, the BS may signal repetition number information to the MS in up to 12 (=2×6) bits of the CRC of the P-BCH or P-SFH. If all of the sub_S-BCHs or sub_S-SFHs are not transmitted, 12 or fewer bits are required. The reserved bit size for representing repetition number information is a maximum bit size, herein 12 bits.

If the sub_S-SFHs are not separately encoded and instead, joint coding may be applied to some or whole sub_S-SFHs, repetition number information may be masked on as many bits as the number of Cyclic Redundancy Checks (CRCs), that is, the number of sub_S-SFH groups subjected to separate coding, in the CRC of the P-BCH or P-SFH. For example, if the number of sub_S-SFH groups subjected to separate coding is 1, which implies that the whole sub_S-SFHs are to be jointly encoded, 2-bit masking is performed. If the number of sub_S-SFH groups subjected to separate coding is N, repetition number information is masked on (N×2) bits.

When the sub_S-BCHs or sub_S-SFHs are arranged in an ascending or descending order, the BS may not need signal the number of each sub_S-BCH or sub_S-SFH separately to the MS. The MS may identify a received sub_S-BCH or sub_S-SFH by indication information set in the P-BCH/P-SFH or S-BCH/S-SFH and find out repetition number information using the indication information without a large overhead. In this case, the MS may identify repetition number information about each sub_S-BCH or sub_S-SFH from the CRC of a P-BCH or P-SFH received from the BS.

In the system that transmits S-BCHs or S-FCHs in a group to MSs, a BS may signal repetition number information to an MS by masking repetition number information about each S-BCH or S-SFH in a predetermined number of bits of the CRC of a P-BCH or P-SFH. For example, if an S-BCH or S-FCH can be transmitted up to four times, repetition number information about the S-BCH or S-FCH may be masked on 2 bits of the CRC of the P-BCH or P-SFH. 00, 01, 10 and 11 may represent repetition numbers 0, 1, 2, and 3, respectively. In this manner, the MS may identify the repetition number of an S-BCH or S-SFH from the CRC of a P-BCH or P-SFH received from the BS.

A third method for signaling repetition number information is to mask the CRC of an S-BCH or S-SFH with repetition number information, which obviates the need for additional signaling to the MS. As in the first method for signaling repetition number information, there may be a system that transmits an S-BCH or S-SFH separately as a plurality of sub_S-BCHs or sub_S-SFHs to MSs, and a system that transmits S-BCHs or S-SFHs in a group to MSs.

In the system that transmits an S-BCH or S-SFH separately as a plurality of sub_S-BCHs or sub_S-SFHs to MSs, repetition number information about each sub_S-BCH or sub_S-SFH may be masked on a predetermined number of bits in the CRC of the sub_S-BCH or sub_S-SFH. If each sub_S-BCH or sub_S-SFH can be transmitted up to four times, the number of bits on which repetition number information about each sub_S-BCH or sub_S-SFH is masked may be 2. For instance, 00, 01, 10 and 11 may represent repetition numbers 0, 1, 2 and 3, respectively. In this case, the MS may identify the repetition number of each sub_S-BCH or sub_S-SFH from the CRC of the sub_S-BCH or sub_S-SFH.

In the system that transmits S-BCHs or S-FCHs in a group to MSs, a BS may signal repetition number information to an MS by masking repetition number information about each S-BCH or S-SFH in a predetermined number of bits of the CRC of the S-BCH or S-SFH. For example, if an S-BCH or S-FCH can be transmitted up to four times, repetition number information about the S-BCH or S-FCH may be masked on 2 bits of the CRC of the S-BCH or S-SFH. 00, 01, 10 and 11 may represent repetition numbers of 0, 1, 2, and 3, respectively. In this manner, the MS may identify the repetition number of an S-BCH or S-SFH from the CRC of the S-BCH or S-SFH.

Figure 6:
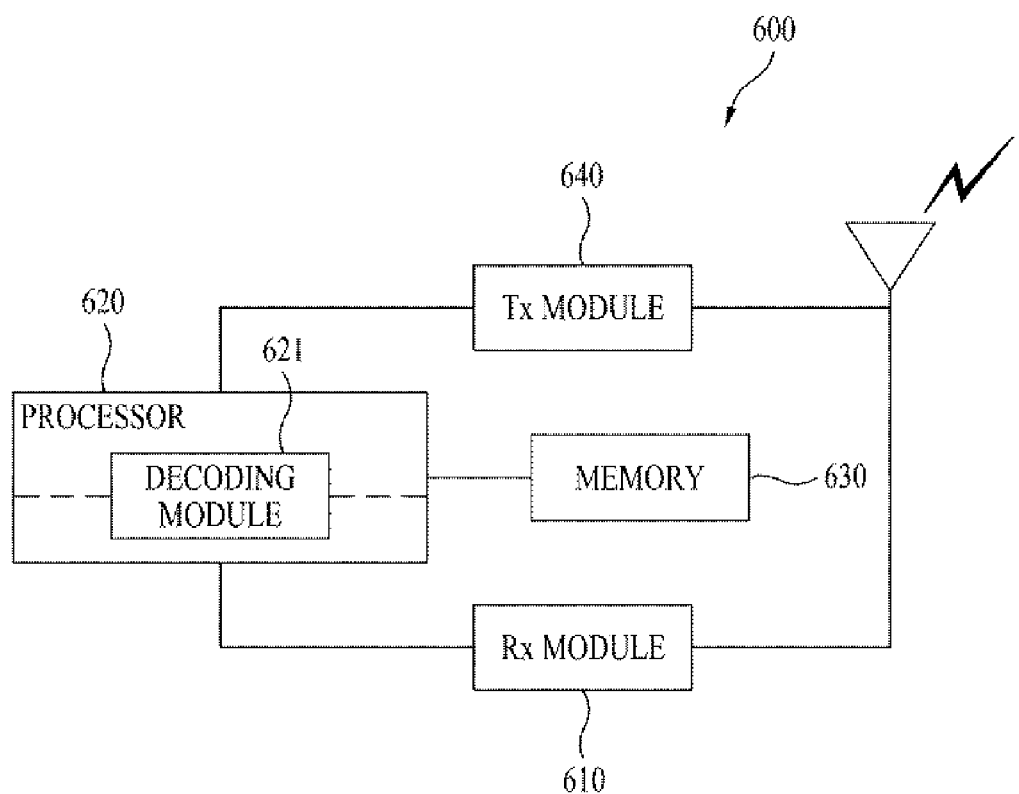
FIG. 6 is a block diagram of a Mobile Station (MS) apparatus for receiving resource allocation information according to an exemplary embodiment of the present invention.

FIG. 6 is a block diagram of an MS apparatus 600 for receiving resource allocation information according to an exemplary embodiment of the present invention.

Referring to FIG. 6, the MS apparatus 600 may include a Reception (Rx) module 610, a processor 620, a memory 630, and a Transmission (Tx) module 640.

The Rx module 610 receives resource allocation information about the remaining region except for a region carrying an SFH in a predetermined channel bandwidth via the SFH from a BS. The remaining region may be allocated as DRUs or CRUs, and the DRUs or CRUS may be allocated on a miniband basis, each miniband including one PRU. Or the remaining region may be allocated as DRUs and CRUs. The CRUs may be allocated on a subband basis and the DRUs may be allocated on a miniband basis.

For example, the resource allocation information that the Rx module 610 receives from the BS may include indication information indicating one of the number of the CRUs, the number of the DRUs, and the ratio between the CRUs and the DRUs. The resource allocation information may further include information about the number or size of subband the CRUs and the number or size of miniband the DRUs.

In addition, the Rx module 610 may receive repetition number information about a sub_S-BCH or sub_S-SFH by a P-BCH/P-SFH, or an S-BCH/SP-SFH. The repetition number information specifies the repetition number of the sub_S-BCH or sub_S-SFH.

The processor 620 may include a decoding module 621. The decoding module 621 decodes the resource allocation information received from the BS. The decoding module 621 may decode repetition number information masked on the P-BCH/P-SFH, or the S-BCH/S-SFH.

The memory 630 may store information computed by the processor 620, information received from the BS, etc. for a predetermined time. The memory 630 may be replaced with a structure such as a buffer (not shown).

The Tx module 640 may transmit UL signals, information, and data to the BS, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

That is, it will be understood that this patent should not be limited to the specific embodiments described herein, but be accorded a right to the broadest scope consistent with the principles and novel features disclosed herein.

Mode For The Invention

Various embodiments have been described in the best mode for carrying out the invention.

Industrial Applicability

Methods for transmitting and receiving resource allocation information and an MS apparatus using the same according to the exemplary embodiments of the present invention are applicable to a Long Term Evolution (LTE) system, an IEEE 802.16m system, and other systems.

The invention claimed is:

1. A method for receiving resource allocation information at a Mobile Station (MS), the method comprising:
   receiving a SuperFrame Header (SFH) indicating Contiguous Resource Unit (CRU)/Distributed Resource Unit (DRU) ratio information for a first region, the first region being a remaining region other than a second region carrying the SFH in a predetermined bandwidth; and
   decoding the SFH to obtain resource allocation information of the first region,
   wherein the first region is allocated as zero or more DRUs and zero or more CRUs using the CRU/DRU ratio information,
   wherein the second region is allocated as one or more DRUs, and
   wherein each DRU is allocated on a miniband basis and each CRU is allocated on a subband basis.

2. The method according to claim 1, wherein the SFH is a secondary SFH (S-SFH).

3. The method according to claim 1, wherein the number of CRUs or DRUs is expressed as one of the number of PRUs, the number of minibands, and the number of subbands.

4. The method according to claim 1, wherein the first region includes one or more Frequency Partitions (FPs).

5. The method according to claim 4, wherein if the first region includes a plurality of FPs, the resource allocation information is information corresponding to each frequency partition.

6. A method for transmitting resource allocation information at a Base Station (BS), the method comprising:
   transmitting a SuperFrame Header (SFH) indicating Contiguous Resource Unit (CRU)/Distributed Resource Unit (DRU) ratio information for a first region, the first region being a remaining region other than a second region carrying the SFH in a predetermined bandwidth,
   wherein the first region is allocated as zero or more DRUs and zero or more CRUs using the CRU/DRU ratio information,
   wherein the second region is allocated as one or more DRUs, and
   wherein each DRU is allocated on a miniband basis and each OW is allocated on a subband basis.

7. A Mobile Station (MS) apparatus for receiving resource allocation information, the MS apparatus comprising:
   a reception module for a SuperFrame Header (SFH) indicating more Contiguous Resource Unit (CRU)/Distributed Resource Unit (DRU) ratio information for a first region, the first region being a remaining region other than a second region carrying the SFH in a predetermined bandwidth; and
   a decoding module for the SFH to obtain resource allocation information of the first region,
   wherein the first region is allocated as zero or more DRUs and zero or more CRUs using the CRU/DRU ratio information,
   wherein the second region is allocated as one or more DRUs, and
   wherein each DRU is allocated on a miniband basis and each CRU is allocated a subband basis.

* * * * *